Figure 1:
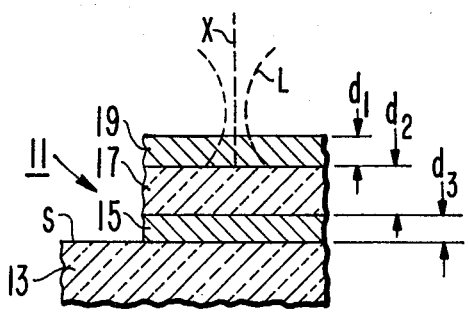

United States Patent [19]

Bell

[11] 4,270,132
[45] May 26, 1981

[54] INFORMATION RECORD

[75] Inventor: Alan E. Bell, East Windsor, N.J.

[73] Assignee: RCA Corporation, New York, N.Y.

[21] Appl. No.: 29,217

[22] Filed: Apr. 12, 1979

Related U.S. Application Data

[63] Continuation-in-part of Ser. No. 782,035, Mar. 28, 1977, abandoned.

[51] Int. Cl.³ ............................................ G01D 15/34
[52] U.S. Cl. .............................. 346/135.1; 346/76 L; 430/945; 369/275; 369/284
[58] Field of Search .......................... 346/135.1, 76 L; 179/100.1 G, 100.3 V; 430/945

[56] References Cited

U.S. PATENT DOCUMENTS

| | | | |
|---|---|---|---|
| 3,665,483 | 5/1972 | Becker | 346/135.1 X |
| 4,023,185 | 5/1977 | Bloom | 346/135.1 |
| 4,069,487 | 1/1978 | Kasai | 346/135.1 X |
| 4,097,895 | 6/1978 | Spong | 346/135.1 X |

OTHER PUBLICATIONS

Bouwhois et al., "The Optical Scanning System of the Plilips'VLP' Record Player," Philips Tech. Rev. 33, 1973, No. 7, pp. 186–189.
Greenblott, High Density Information Recording by Vaporization of Film Areas, IBM Tech. Disc. Bulletin, vol. 14, No. 8, Jan. 1972, p. 2358.
Bell et al., Antireflection Structures for Optical Recording, IEEE, Journal of Quantum Electronics, vol. QE-14, No. 7, Jul. 1978, pp. 487–495.

*Primary Examiner*—Joseph W. Hartary
*Attorney, Agent, or Firm*—E. M. Whitacre; J. S. Tripoli; J. E. Roehling

[57] ABSTRACT

A flat major surface of a disc-shaped substrate (e.g., of glass) is coated with a first light reflective layer (e.g., Rhodium) which is coated with a layer of a dielectric material (e.g., silicon dioxide) highly transparent of light of a frequency supplied by a playback laser, which transparent layer is coated with a second light reflective layer (e.g., Rhodium). The light output of a recording laser, which is intensity modulated in accordance with a signal to be recorded, is focused upon the coated surface of the disc as the disc is rotated. With the peak intensity of the focused light sufficient to at least cause melting of the second reflective layer, an information track is formed as a succession of spaced pits in which the first reflective layer is effectively exposed through the layer of dielectric material. For playback, light of a constant intensity is focused on the information track and the adjacent land areas as the disc is rotated. The focused light is of insufficient intensity to effect melting of the remaining portions of the second reflective layer, but is of a frequency at which the thickness of the dielectric layer exposed through the pits introduces a phase change of approximately $(2K+1)\pi$ radians between reflected portions of the focused light which fall on the pits and reflected portions of the focused light which fall on the undisturbed areas of the disc, where k is zero or any integer. A photodetector, positioned to receive light reflected from the information track as the pits pass through the path of the focused light, develops a signal representative of the recorded information.

7 Claims, 4 Drawing Figures

INFORMATION RECORD

This is a continuation-in-part of application Ser. No. 782,035 filed Mar. 28, 1977 now abandoned.

The present invention relates to a novel high-density information record structure suitable for use with optical recording and playback apparatus and methods.

It has been proposed in the prior art (e.g., "Philips' Technical Review" 33, No. 7, pgs. 178-180) to effect video information storage in a "phase structure" record (i.e., a record structure which modifies the phase of an incident beam of radiation). Such a phase structure record, usually in the shape of a disc, comprises a plurality of pits which have been pressed into the surface of the disc and successively arranged along a spiral track in an information coded pattern. The distance between the plane of the land areas adjacent to the pits and that of the pit bottoms is chosen such that incident radiation from a playback beam which is reflected at a pit bottom traverses an optical path length which is approximately $(2n+1)\lambda/2$ (where $\lambda$ is the wavelength of the beam and n is an integer) shorter or longer than the optical path length covered by incident radiation which is reflected from the land areas. Through such a choice of distance, the phase structure exhibits high reflectivity when a read beam, which is focused on the spiral track and the adjacent land areas, falls on an area intermediate of the pits, while exhibiting low reflectivity when the read beam falls on both a pit and the surrounding land area (due to destructive interference "phase cancellation" between the radiation respectively reflected from the bottom of the pit and the adjacent land area). In this way, as the disc record is rotated, the intensity of the radiation reflected from the track is modulated by the coded pattern of pits and the recorded information may, therefore, be recovered from the reflected radiation through appropriate means (e.g., photo detector and related decoding circuitry).

In accordance with the principles of the present invention, the aforesaid phase structure record is advantageously realized by a recording medium which allows for direct "real time" information recording thereon and which further allows for immediate playback of the recorded information without the need for any intermediate processing or developing steps.

In further accordance with the principles of the present invention, an illustrative recording medium is advantageously realized in the form of a substrate having a surface which is reflective (at least at the frequency of a light forming a playback beam), with a layer of material, transparent at the playback beam light frequency, overlying the reflective surface, and a second layer of material, reflective at the playback beam light frequency, overlying the transparent layer. With the thickness of the dielectric layer being chosen, with respect to the frequency of the playback radiation beam, to provide, in the plane of the surface of the record, a one-half wavelength phase difference between light reflected from the substrate surface ("bottom" reflective layer) and light reflected from the second "top" reflective layer, the ability to accurately effect phase cancellation is enhanced.

In accordance with one aspect of the present invention, the top reflective layer is desirably chosen of a material having high absorption at the frequency of a light forming a recording beam so as to reduce the thickness of the top reflective layer while allowing for the absorption of a maximum fraction of the recording light incident thereon. The heat absorbed in the top reflective layer from the recording beam is effective in melting portions of the top reflective layer leading to the formation of a pit. Rapid heat diffusion in the dielectric layer and the bottom reflective layer assures that these layers will remain unaffected by the recording beam.

Pursuant to another aspect of the present invention, the aforesaid tri-layer construction of the recording medium advantageously provides for a lessened sensitivity of the record medium to fluctuations in the high intensity level of the recording beam. This results from the fact that the phase cancellation effect is a product of the thickness of the transparent layer and the reflectivity of the bottom reflective layer, both of which are independent of the recording process.

In accordance with yet another aspect of the present invention, the tri-layer construction of the recording medium allows for the use of different reflective materials respectively for the top and bottom reflective layers. Compensation for the reduced reflectivity of the bottom reflective layer, due to the presence of the dielectric layer, may therefore be easily achieved by forming the bottom, reflective layer of a material having high reflectivity than the reflectivity of the material chosen for the top reflective layer. The difference in reflectivity is desirably made to correspond to the reduced reflectivity of the bottom reflective layer to thereby enhance the phase cancellation effect.

In accordance with a first illustrative embodiment of the present invention, a surface of a glass substrate of disc form is processed so as to form a polished flat surface, which is then coated with a first layer of reflective material (e.g., Rhodium). A layer of material (e.g., a dielectric material, such as silicon dioxide) which is transparent at the light frequency of a monochromatic light source available for recording use (e.g., an argon laser, providing an output at a wavelength of 4880 angstrom units) is deposited over the reflective layer. Finally, a second opaque layer of a material reflective at the light frequency of the recording light source (e.g., Rhodium) is coated over the transparent layer.

In accordance with a second illustrative embodiment of the present invention, an information record formed in accordance with the principles of the present invention is provided with a first reflective layer which is formed of a material (e.g., Aluminum) having a higher reflectivity than the material utilized in forming the top reflective layer (e.g., Rhodium). The information record of the second illustrative embodiment conforming in all other respects to the first illustrative embodiment of the invention.

In an illustrative recording system (e.g., of a type described in copending U.S. Application Ser. No. 668,495 to F. W. Spong now U.S. Pat. No. 4,097,895) a record blank of the above-described disc form embodying the principles of the present invention is subjected to rotation at a constant rotational speed while a beam of light from a light source (e.g., a laser, providing light at a frequency at which the top reflective layer is absorptive) is focused on the coated surface of the disc. The intensity of the light beam is controlled in accordance with information to be recorded. Illustratively, the control is effected in accordance with carrier waves modulated in frequency by picture-representative video signals, with the light beam intensity varying as a result between a high level sufficient to effect melting of the absorptive material and a low level insufficient to effect such melting, the frequency of the level alternations varying as the video signal amplitude changes. An information track comprising a succession of spaced pits is thus formed in the coated surface of the disc, the pits appearing in those surface regions exposed to the high level beam, due to melting of the top reflective layer material in response to the high level beam exposure with variations in the length and separation of the pits being representative of the recorded information. Where a continuous sequence of pictures is to be recorded, a spiral information track may be formed by providing relative motion, in a radial direction and at a constant rate during the recording between the recording beam and the rotating disc. Alternatively, in the absence of such relative motion during the recording, a circular information track may be formed, appropriate for "slide" recording purposes.

The result of the above-described recording process is the formation of an information record of a form which facilitates recovery of the recorded information by optical playback processes. The information track of such an information record will comprise (1) undisturbed surface regions alternating with (2) pits formed by the melting process that introduce at an appropriate light beam frequency, a phase change of approximately $(2K+1)\pi$ radians between portions of the light beam which respectively fall on the pits and the undisturbed regions, where k is zero or any integer. With such a record structure, a high readout contrast ratio between the reflectance of a region comprising approximately equal pit and surrounding land areas and the reflectance of the intervening (undisturbed surface) regions is readily obtained.

The playback beam has a constant intensity at a level insufficient to effect melting of the disc coatings, and is of a frequency substantially corresponding to that at which the dielectric material layer is transparent. A photodetector, positioned to receive light reflected from the successive regions of the information track as they pass through the path of the focused light, develops a signal representative of the recorded information.

Figure 2:
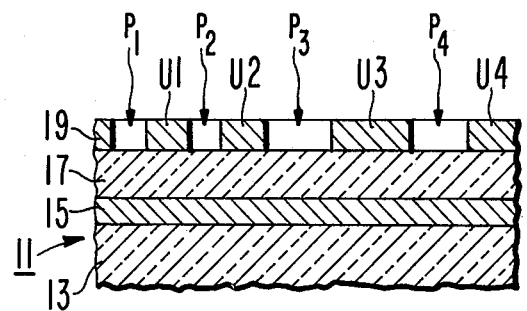
Figure 3:
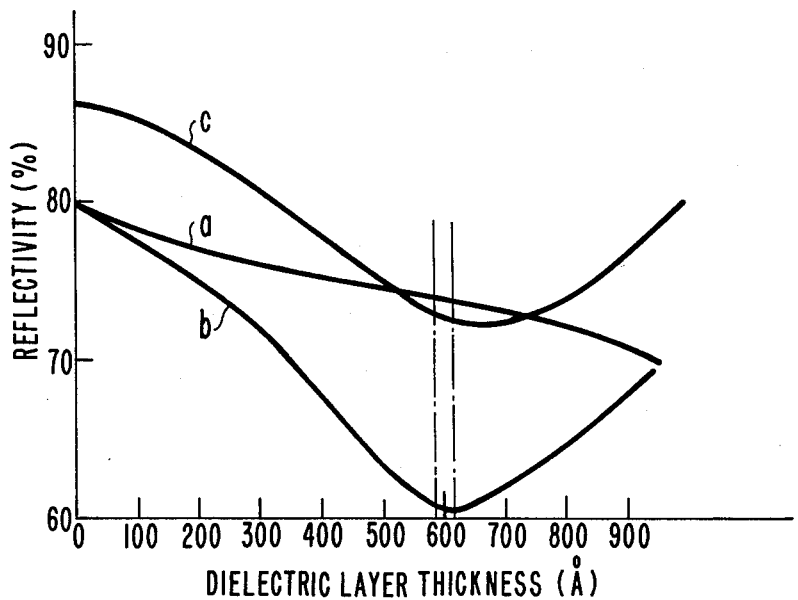
Figure 4:
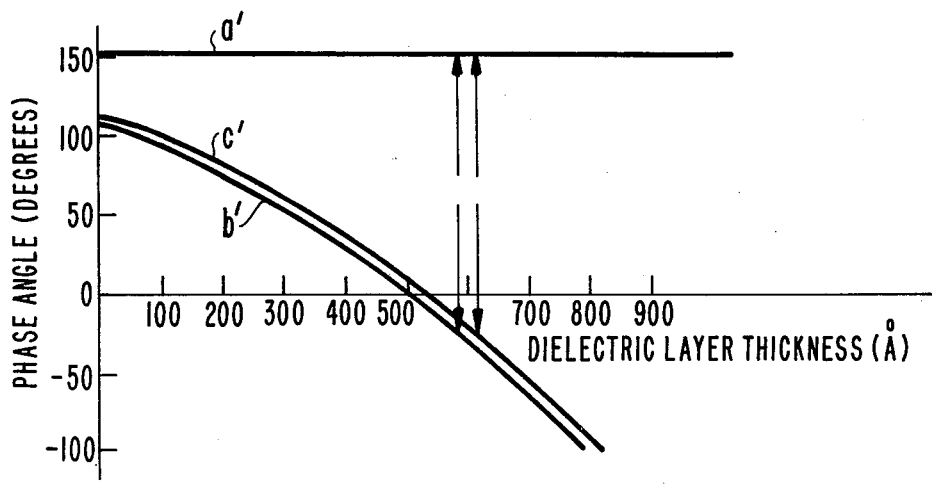

In the accompanying drawings:

FIG. 1 provides a cross-sectional view of a portion of a recording medium, exhibiting a construction in accordance with principles of the present invention;

FIG. 2 illustrates a cross-sectional view of a portion of the information track of an information record formed from a recording medium of the type shown in FIG. 1 pursuant to principles of the present invention;

FIG. 3 provides a graph of the relationship between dielectric layer thickness and reflectance for the various reflective layers of an illustrative form of the recording medium of FIGS. 1 and 2; and FIG. 4 provides a graph of the relationship between dielectric layer thickness and the phase angle of the playback light beam reflected from the various reflective layers of an illustrative form of the recording medium of FIGS. 1 and 2.

In FIG. 1, a cross-sectional view of a portion of a record blank 11, formed for use in an optical recording system, shows the construction of a recording medium pursuant to an illustrative embodiment of the present invention. The record blank 11 includes a substrate 13, which is illustratively formed in the shape of a disc, a major surface (s) of which is processed to be polished and flat. Desirably, the substrate 13 is formed of a material, such as glass, for example, which may be conveniently processed to achieve such surface.

Overlying the surface "s" of the substrate 13 is a thin layer 15 of a material exhibiting reflectivity (over at least a given portion of the light spectrum). Illustratively, the reflecting layer 15 is formed of a 1,000 Å thick layer of a metal, such as Rhodium, for example, deposited on the surface "s" by an evaporation process.

Overlying the reflective layer 15 is a layer 17 of material which is light transparent (at least over the aforementioned given portion of the light spectrum). Illustratively, the absorptive layer 17 is formed of a dielectric material, such as silicon dioxide, for example, deposited on the reflecting layer 15 by an evaporation process.

Finally, overlying the transparent layer 17 is an opaque layer 19 of a reflective material which is also light absorptive at least over the aforementioned given portion of the light spectrum. Illustratively, the top reflective layer 19 is formed of a 300 Å thick layer of rhodium, deposited on the transparent layer 17 by an evaporation process.

In the illustrative construction of the recording medium, information recording is effected when a light beam L (of a frequency in the aforementioned given portion of the spectrum) is directed along an axis (x) normal to the surface "S", and focused at or near the surface of the top reflective layer 19. When the intensity of the focused light beam L is of sufficient magnitude, material of the top reflective layer 19 is elevated to a melting temperature, and melting of the material occurs, forming a pit in the surface of the record blank 11. With suitable modulation of the intensity of the beam L in accordance with a recording signal, as successive regions of the record blank 11 pass through the beam path, an information track may be formed comprising spaced pits in regions of the top reflective layer subject to the high intensity beam exposure, separated by undisturbed regions of the top reflective layer (that were not subject to such high intensity beam exposure).

FIG. 2 illustrates a portion of an information record formed when the record blank 11 of FIG. 1 is subjected to such controlled beam exposure. As shown in cross-section in FIG. 2, the information track comprises a succession of spaced pits $p_1$, $p_2$, $p_3$, $p_4$, separated by regions ($u_1$, $u_2$, $u_3$, $u_4$) in which the surfaces of the top reflective layer 19 is undisturbed. For illustrative purposes, the depth of each pit is shown as being equal to the thickness of the top reflective layer 19, whereby the bottom reflective layer 15 is wholly uncovered through the transparent layer 17 in the pit regions. As will be discussed subsequently, while such a depth of melting may desirably result in maximization of the readout contrast ratio, it is not essential for good playback results. Thus, in an acceptable alternative to the illustrated form of information record, a residual portion of the absorptive material (with a thickness, of course, less than the original layer thickness) may overlie the transparent layer 17 in the pit bottoms.

When the light frequency of a playback beam provided by a laser falls in the given spectrum portion for which the top and bottom layers 15 and 19 are reflective and at or close to the frequency at which the pit regions of the system 19-17-15-13 exhibit the phase cancellation effect, a high readout contrast ratio is realized, permitting video signal recovery with a high signal-to-noise ratio.

FIG. 3 illustrates the relationship between the dielectric layer thickness and reflectance, at the surface of the recording medium of FIG. 1, computed for the various reflective layers of an illustrative form of the recording medium. Curve a of the graph represents the reflectance of a top layer 19 of the record medium of FIG. 1 which is formed of a 300 Å thick layer of rhodium. Curves b and c represent the reflectance, through a 300 Å thick air layer and the dielectric layer, of bottom layers 15 formed respectively of rhodium (1,000 Å thick), and aluminum (200 Å thick).

With reference now to FIG. 4, there is illustrated the relationship between the dielectric layer thickness and the phase angle, at the surface of the recording medium of FIG. 1, computed for a playback beam (of 4,880 Å wavelength) reflected from the various reflective layers of the recording medium. Curve a' represents the phase angle of light reflected off the top reflective layer 19 of the recording medium of FIG. 1. Since the top layer 19 overlies the dielectric layer 17, the phase angle of the light reflected therefrom will be unaffected by variations in the thickness of the dielectric layer. Curves b' and c' on the other hand, are respectively representative of the phase angle of light reflected off the rhodium and aluminum bottom reflective layers and passing through the dielectric layer and a 300 Å thick air layer.

It will be noted from FIG. 4 that a phase angle difference of 180° between curves a' and b' occurs at a dielectric layer thickness of 570 Å. Similarly, the dielectric layer thickness for a phase angle difference of 180° between curves a' and c' may be found to be 615 Å.

When a recording medium, in accordance with the present invention, is formed with a rhodium-silicon dioxide rhodium structure following the aforementioned parameters (i.e., top layer thickness 300 Å, dielectric layer thickness 570 Å, bottom layer thickness 1,000 Å and playback light wavelength of 4880 Å), the reflectance R for the surface area covered by a light beam, of the aforementioned appropriate frequency, which falls on approximately equal pit and surrounding land areas, may be calculated using the following equation:

$$R = (\sqrt{R_1} - \sqrt{R_2})^2 \tag{1}$$

where $R_1$ is the reflectance of the undisturbed surface regions and $R_2$ is the reflectance of the bottom layer. Therefore for $R_1 = 0.74$ and $R_2 = 0.61$ (from FIG. 3) R will equal 0.01 and the contrast ratio for a recorded disc blank of the rhodium-silicon dioxide-rhodium structure will approximate 74:1.

Better results are achievable with a rhodium-silicon dioxide-aluminum structure following the aforementioned parameters (i.e., top layer thickness 300 Å, dielectric layer thickness 615 Å, bottom layer thickness 200 Å and playback light wavelength of 4880 Å). Utilizing the aforementioned equation with $R_1 = 0.74$ and $R_2 = 0.725$ (from FIG. 3), the reflectance R may be calculated to equal to $8 \times 10^{-5}$, which reflectance is smaller by a factor of 100 than the reflectance obtained above by utilizing a rhodium bottom layer.

Selection of the respective layer materials and layer thicknesses has been illustrated with regard to FIGS. 3 and 4. The layer materials and thicknesses may also be determined by other techniques. One technique which will be illustrated with reference to FIGS. 1 and 2 includes the following. Layer 19 of record blank 11 is chosen to be of a material which is highly absorptive and highly reflective to light at the recording wavelength, λ. The thickness of layer 19 is chosen such that layer 19 is substantially opaque to a light beam L incident on the surface of the record blank 11. Illustratively, a rhodium layer of a thickness of approximately 300 Å provides a metal layer which is highly reflective (illustratively 74% of the incident light is reflected), highly absorptive (illustratively 22.2% of incident light is absorbed), and substantially opaque (illustratively, 3.8% of the incident light is transmitted) to a recording light beam of 4880 Å wavelength.

Similarly, layer 15 is chosen to be of a material which is reflective to light at the recording wavelength. Illustratively, a rhodium or aluminum layer of a thickness greater than 300 Å provides a highly reflective layer.

Interposed between reflective layer 15 and absorptive layer 19 is a layer 17 which is formed of a material which is transparent to light at the recording wavelength, λ. Illustratively, the transparent layer 17 is formed of a dielectric material such as silicon dioxide. The thickness of layer 17 is chosen to effect phase cancellation between reflective portions of the playback light beam.

Referring to FIG. 2, a phase cancellation condition is set up in pit regions $p_1$, $p_2$, $p_3$, $p_4$ to effect a high readout contrast ratio between pits and undisturbed regions during information recovery. To achieve this phase cancellation effect, the layer materials and thicknesses are chosen such that one portion of the readout light beam which is reflected from layer 15 in a pit region is 180° out of phase with another portion of the readout light beam which is reflected from layer 19 at a reference point above the record surface (e.g., at the top of layer 19).

A light beam reflected from an interface between two materials (e.g., air and metal) undergoes a phase shift between the incident and reflected beams. This phase shift is dependent upon the optical constants of the materials at the interface. The phase shift δ which occurs at an interface is given by the equation:

$$\delta = \tan^{-1}\left[\frac{2n_A K_b}{n_A^2 - n_B^2 - K_b^2}\right] \tag{2}$$

where $n_A$ is the refractive index of the material in which the incident light beam is traveling, $n_B$ is the refractive index and $K_B$ is absorption index of the reflecting material. The complex refractive index of material B is thus $n_B^* = n_B - iK_B$.

A playback light beam incident on the surface of record blank 11 of FIG. 2 which overlaps a pit will be split into two portions. One portion will be reflected by layer 19; the other portion will be reflected by layer 15. That portion reflected by layer 19 will undergo a phase shift, $\delta_1$, the magnitude of said phase shift can be determined by solving equation 1. Illustratively, $\delta_1 = -26.1°$ for an air, rhodium interface. The other portion which is reflected by layer 15 will traverse an air layer of the pit of thickness $d_1$, traverse the transparent layer of thickness $d_2$, undergo a phase shift $\delta_2$ upon reflection from layer 15 (illustratively, $\delta_2 = 37.8°$ for a $SiO_2$, rhodium interface), traverse layers 15 and the air layer of the pit again.

Choosing a reference point at the top of layer 19, equation 3 provides a solution to effect phase cancellation dependent upon phase shift, layer thicknesses and optical constants.

$$\delta_1 = 180° - 360° \left(\frac{2d_1}{\lambda}\right) - 360° \left(\frac{2d_2 n_D}{\lambda}\right) + \delta_2 \qquad (3)$$

where $n_D$ is the refractive index of the dielectric layer.

Solving for $d_2$, equation 4 provides a measure of the transparent layer thickness to effect phase cancellation $$d_2 = \frac{\lambda}{360° (2n_D)} \left[\delta_2 - \delta_1 - 360° \left(\frac{2d_1}{\lambda}\right) + 180°\right] \qquad (4)$$

Illustratively, $d_2$ is equal to 560 A of $SiO_2$ ($n_D = 1.5$) where layers 15 and 19 are each formed of rhodium of a thickness of 300 A having optical constants $n = 1.08$ and $K = -4.04$ and the recording wavelength $\lambda$ is equal to 4880 A.

While the principles of the present invention have been demonstrated with particular regard to the illustrative structures of FIGS. 1 and 2, it will be recognized that various departures from such illustrative structures may be undertaken in practice of the invention. For example, the substrate itself may be formed of material having high reflectivity, eliminating the need for employing a separate reflecting layer in forming a reflective surface underlying the absorptive layer. For another example, since wideband reflection is not required of the reflecting layer, the metal coating may be supplanted by a multilayer (or even a single layer) dielectric reflector. It should also be appreciated that other forms of optical recording (such as pulsed holographic recording) may use the advantageodus record blank structure described herein.

What is claimed is:

1. A record blank for use in optical recording and playback with a light beam having a given light frequency corresponding to a wavelength, $\lambda$, within a given portion of the light spectrum, said record blank comprising, in combination:

a substrate;

a first layer of material exhibiting high reflectivity over at least said given portion of the light spectrum, said first layer overlying a surface of said substrate;

a second layer of material exhibiting light transparency over at least said given portion of the light spectrum and having a refractive index, $n_D$, said second layer overlying said first layer; and a third layer of material exhibiting high reflectivity over at least said given portion of the light spectrum, high absorptivity to light at said given frequency, and substantial opacity to light at said given frequency, said third layer having a thickness $d_1$ overlying said second layer;

said first layer effecting a phase shift $\delta_2$ to light reflected from the interface between said first layer and said second layer and said third layer effecting a phase shift $\delta_1$ to light reflected therefrom;

the thickness of said second layer in the units of the wavelength $\lambda$, being equal to:

$$\frac{\lambda}{360(2n_D)} \left[\delta_2 - \delta_1 - 360\left(\frac{2d_1}{\lambda}\right) + 180\right].$$

2. A record blank in accordance with claim 1 wherein the reflectivity of said first layer is greater than the reflectivity of said third layer at said light frequency within said given spectrum portion.

3. A record blank in accordance with claim 1 wherein said substrate is in the form of a disc, and wherein said first layer is formed by a metal coating on a major surface of said disc.

4. A record blank in accordance with claim 3 wherein said second layer comprises silicon dioxide.

5. A record blank in accordance with claim 4 wherein said third layer is formed by a metal coating.

6. A record blank in accordance with claim 5 wherein said disc is formed of glass.

7. A record blank for use in optical recording and playback with a light beam having a given light frequency corresponding to the wavelength, $\lambda$, within a given portion of the light spectrum, said record blank comprising, in combination:

a substrate having a light reflective surface, said surface exhibiting high reflectivity over at least said given portion of the light spectrum;

a first layer of material exhibiting light transparency over at least said given portion of the light spectrum and having a refractive index, $n_D$, said first layer overlying a surface of said substrate;

a second layer of material exhibiting high reflectivity over at least said given portion of the light spectrum, high absorptivity to light at said given frequency, and substantial opacity to light at said given frequency, said second layer having a thickness $d_1$ overlying said first layer;

the reflective surface of said substrate effecting a phase shift $\delta_2$ reflected to light from the interface of said reflective surface and said first layer and said second layer effecting a phase shift $\delta_1$ to light reflected therefrom;

the thickness of said first layer in the units of the wavelength $\lambda$, being equal to:

$$\frac{\lambda}{360(2n_D)} \left[\delta_2 - \delta_1 - 360\left(\frac{2d_1}{\lambda}\right) + 180\right].$$

* * * * *

UNITED STATES PATENT AND TRADEMARK OFFICE
CERTIFICATE OF CORRECTION

PATENT NO. : 4,270,132
DATED : May 26, 1981
INVENTOR(S) : Alan E. Bell

It is certified that error appears in the above—identified patent and that said Letters Patent is hereby corrected as shown below:

The term of this patent subsequent to November 11, 1997, has been disclaimed.

Signed and Sealed this

Eighteenth Day of August 1981

[SEAL]

Attest:

Attesting Officer

GERALD J. MOSSINGHOFF

Commissioner of Patents and Trademarks